United States Patent
Yoneda et al.

(10) Patent No.: US 10,427,109 B2
(45) Date of Patent: Oct. 1, 2019

(54) COMPOSITE SEMIPERMEABLE MEMBRANE AND PRODUCTION THEREOF

(71) Applicant: TORAY INDUSTRIES, INC., Chuo-ku, Tokyo (JP)

(72) Inventors: Keisuke Yoneda, Shiga (JP); Shunsuke Tabayashi, Shiga (JP); Takafumi Ogawa, Shiga (JP); Takao Sasaki, Shiga (JP); Masahiro Kimura, Shiga (JP)

(73) Assignee: TORAY INDUSTRIES, INC., Tokyo (JP)

(*) Notice: Subject to any disclaimer, the term of this patent is extended or adjusted under 35 U.S.C. 154(b) by 730 days.

(21) Appl. No.: 14/771,057

(22) PCT Filed: Feb. 28, 2014

(86) PCT No.: PCT/JP2014/055058
§ 371 (c)(1),
(2) Date: Aug. 27, 2015

(87) PCT Pub. No.: WO2014/133130
PCT Pub. Date: Sep. 4, 2014

(65) Prior Publication Data
US 2016/0008773 A1   Jan. 14, 2016

(30) Foreign Application Priority Data
Feb. 28, 2013   (JP) ................... 2013-039649

(51) Int. Cl.
| | | |
|---|---|---|
| *B01D 71/56* | (2006.01) | |
| *B01D 67/00* | (2006.01) | |
| *B01D 69/02* | (2006.01) | |
| *B01D 69/12* | (2006.01) | |
| *B32B 5/12* | (2006.01) | |
| *B32B 27/34* | (2006.01) | |
| *C02F 1/44* | (2006.01) | |
| *C02F 101/10* | (2006.01) | |
| *C02F 103/08* | (2006.01) | |

(52) U.S. Cl.
CPC ......... *B01D 71/56* (2013.01); *B01D 67/0006* (2013.01); *B01D 67/0093* (2013.01); *B01D 69/02* (2013.01); *B01D 69/12* (2013.01); *B01D 69/125* (2013.01); *B32B 5/12* (2013.01); *B32B 27/34* (2013.01); *C02F 1/44* (2013.01); *B01D 2323/02* (2013.01); *B01D 2323/30* (2013.01); *B01D 2325/20* (2013.01); *C02F 2101/108* (2013.01); *C02F 2103/08* (2013.01)

(58) Field of Classification Search
CPC combination set(s) only.
See application file for complete search history.

(56) References Cited

U.S. PATENT DOCUMENTS

| 4,612,118 | A | 9/1986 | Kamiyama et al. |
|---|---|---|---|
| 8,631,946 | B2 | 1/2014 | Sasaki et al. |
| 2010/0143733 | A1 | 6/2010 | Mickols et al. |
| 2012/0024789 | A1* | 2/2012 | Sarkar ................... B01D 65/08 210/652 |
| 2012/0248027 | A1 | 10/2012 | Sasaki et al. |
| 2012/0305473 | A1* | 12/2012 | Ogawa ................... B01D 69/02 210/500.38 |
| 2013/0126419 | A1 | 5/2013 | Ogawa et al. |
| 2013/0256215 | A1 | 10/2013 | Nakatsuji et al. |
| 2017/0203262 | A1 | 7/2017 | Nakatsuji et al. |

FOREIGN PATENT DOCUMENTS

| CN | 102698614 A | 10/2012 | |
|---|---|---|---|
| CN | 102781560 A | 11/2012 | |
| EP | 0474370 A1 | 3/1992 | |
| EP | 2517782 A1 | 10/2012 | |
| EP | 2604333 A1 | 6/2013 | |
| EP | 2 659 956 A1 | 11/2013 | |
| JP | 55-14706 A | 2/1980 | |
| JP | 2-207827 A | 8/1990 | |
| JP | 5-76740 A | 3/1993 | |
| JP | 9-141071 A | 6/1997 | |
| JP | 10-66845 A | 3/1998 | |
| JP | 10-305216 A | 11/1998 | |
| JP | 2002-177750 A | 6/2002 | |
| JP | 2012-135757 A | 7/2012 | |
| WO | WO 2011/078047 A1 | 6/2011 | |
| WO | WO 2011/105278 A1 | 9/2011 | |
| WO | WO-2011105278 A1 * | 9/2011 | ............. B01D 69/02 |

(Continued)

OTHER PUBLICATIONS

Japanese Office Action, dated Nov. 7, 2017, for Japanese Application No. 2014-514972, as well as an English translation.
Chinese Office Action and Search Report dated Apr. 22, 2016, for Chinese Application No. 201480010945.X with the English translation of the Office Action.
Chinese Office Action, dated Aug. 25, 2017, for Chinese Application No. 201480010945.X, along with an English translation.
Chinese Office Action, dated Mar. 7, 2017, for Chinese Application No. 201480010945.X, as well as an English translation.

(Continued)

*Primary Examiner* — Ryan B Huang
(74) *Attorney, Agent, or Firm* — Birch, Stewart, Kolasch & Birch LLP

(57) ABSTRACT

A composite semipermeable membrane including: a substrate; a porous supporting layer formed on the substrate; and a separation functional layer formed on the porous supporting layer, in which the separation functional layer contains crosslinked wholly aromatic polyamide as a main component and contains a carboxy group, a ratio of (molar equivalent of the carboxy group)/(molar equivalent of an amide group) in functional groups contained in the separation functional layer is 0.40 or more, and an average ratio of oxygen atoms/nitrogen atoms in front and rear sides of the separation functional layer is 0.95 or less.

8 Claims, No Drawings

(56) References Cited

FOREIGN PATENT DOCUMENTS

WO     WO 2012/020680 A1     2/2012
WO     WO 2012/090862 A1     7/2012

OTHER PUBLICATIONS

Extended European Search Report, dated Dec. 5, 2016, for European Application No. 14756631.9.
International Search Report, issued in PCT/JP2014/055058, dated May 27, 2014.
Written Opinion of the International Searching Authority, issued in PCT/JP2014/055058, dated May 27, 2014.
European Office Action, dated Apr. 20, 2018, for European Application No. 14756631.9.
Office Action issued in EP 14756631.9 dated Aug. 9, 2019.

\* cited by examiner

COMPOSITE SEMIPERMEABLE MEMBRANE AND PRODUCTION THEREOF

TECHNICAL FIELD

The present invention relates to a composite semipermeable membrane useful for selective separation of a liquid mixture, and particularly relates to a composite semipermeable membrane useful for treatment under a high solute concentration condition.

BACKGROUND ART

With respect to separation of a mixture, there are various techniques for removing substances (e.g., salts) dissolved in a solvent (e.g., water). In recent years, use of membrane separation methods is expanding for the processes with less energy and resource consumption. The membranes for use in the membrane separation methods include microfiltration membranes, ultrafiltration membranes, nanofiltration membranes, and reverse osmosis membranes, and these membranes are being used in the case of obtaining potable water, for example, from seawater, brackish water, or water containing a harmful substance, and in the production of industrial ultrapure water, wastewater treatment, recovery of valuables, etc (refer to Patent Documents 1 and 2).

Most of the reverse osmosis membranes and nanofiltration membranes that are commercially available at present are composite semipermeable membranes, and there are two types of composite semipermeable membranes: one which includes a gel layer and an active layer obtained by cross-linking a polymer, the layers being disposed on a porous supporting layer; and one which includes an active layer obtained by condensation-polymerizing monomers on a porous supporting layer. Among the latter ones, a composite semipermeable membrane obtained by coating a porous supporting layer with a separation functional layer including a crosslinked polyamide obtained by the polycondensation reaction of a polyfunctional amine with a polyfunctional acid halide is in extensive use as a separation membrane having high permeability and selective separation properties.

When separation is performed by a reverse osmosis membrane, it is required to apply a pressure, equal to or higher than the difference in osmotic pressure between feed water side and permeate side, toward the feed water, and particularly required to use high pressure as operation pressure in the case where the solute concentration of feed water is high and osmotic pressure is high. Further, when the amount ratio of permeate to feed water (this is called yield) becomes high, the solute concentration of concentrate becomes high, and thus high pressure is required as operation pressure. For example, in the case of desalination of seawater, since the osmotic pressure of seawater having total dissolved solids (TDS) concentration of 3.5% is about 2.5 MPa, when desalination of the seawater is performed in a yield of 40%, the solute concentration of concentrate is about 6 wt %, and operation pressure having equal to or higher than the osmotic pressure (about 4.4 MPa) of the concentrate is required. In order to sufficiently obtain the quality and quantity of permeate, it is actually required to apply pressure, about 2 MPa (this pressure is referred to as effective pressure) higher than osmotic pressure of concentrate, toward the concentrate side. In general desalination of seawater in the background art, operation is performed under the conditions of a pressure of about 6 MPa to 6.5 MPa and a yield of about 40%. On the other hand, there is an example that a reverse osmosis membrane apparatus is operated at a pressure of 7 MPa or higher to bring feed water having high solution concentration into contact with a reverse osmosis membrane (refer to Patent Document 3).

In Patent Document 4, there is proposed a crosslinked aromatic polyamide reverse osmosis membrane which can suppress the decrease of the salt rejection ratio and improve the performance stability under a high solute concentration condition by setting the percentage of pleats having a diameter of 150 nm or less in pleats having a height of 1 nm to 600 nm and a diameter of 1 nm to 500 nm existing in a separation functional membrane to 60%.

In Patent Document 5, there is proposed a supporting layer of a reticulate structure having high physical durability, in which linkage between polymers is increased by electrostatic interaction due to the addition of inorganic salts to a raw membrane formation solution for a microporous supporting layer.

BACKGROUND ART DOCUMENT

Patent Document

Patent Document 1: JP-A-55-14706
Patent Document 2: JP-A-5-76740
Patent Document 3: JP-A-10-305216
Patent Document 4: JP-A-9-141071
Patent Document 5: JP-A-2002-177750

SUMMARY OF THE INVENTION

Problems that the Invention is to Solve

In spite of the above-mentioned various proposals, performance stability of a separation membrane under a high solute concentration condition cannot be said to be satisfactory. An object of the present invention is to provide a composite semipermeable membrane which is useful for treatment under a high solute concentration condition.

Means for Solving the Problems

In order to achieve the above-mentioned object, a composite semipermeable membrane of the present invention has the following constitutions.

(1) A composite semipermeable membrane including:
 a substrate:
 a porous supporting layer formed on the substrate; and
 a separation functional layer formed on the porous supporting layer,
 in which the separation functional layer contains crosslinked wholly aromatic polyamide as a main component and contains a carboxy group,
 a ratio of (molar equivalent of the carboxy group)/(molar equivalent of an amide group) in functional groups contained in the separation functional layer is 0.40 or more, and
 an average ratio of oxygen atoms/nitrogen atoms in front and rear sides of the separation functional layer is 0.95 or less.
(2) The composite semipermeable membrane according to (1), in which the separation functional layer contains a phenolic hydroxyl group, and a ratio of (molar equivalent of the phenolic hydroxyl group)/(molar equivalent of the amide group) is 0.10 or less.
(3) The composite semipermeable membrane according to (1) or (2), in which the separation functional layer is coated with a hydrophilic polymer.

(4) The composite semipermeable membrane according to (3), in which the hydrophilic polymer has an average molecular weight of 8,000 or more.
(5) The composite semipermeable membrane according to (3) or (4), in which the hydrophilic polymer is polyethylene glycol or a copolymer containing polyethylene glycol.
(6) The composite semipermeable membrane according to any one of (1) to (5), in which a weight of the porous supporting layer per unit volume, after passing pure water at a temperature of 25° C. and a pressure of 5.5 MPa for 24 hours or more, is 0.50 g/cm$^3$ to 0.65 g/cm$^3$.
(7) The composite semipermeable membrane according to any one of (1) to (6), in which an average impregnation amount of the porous supporting layer into the substrate per unit area is 1.0 g/m$^2$ to 5.0 g/m$^2$, and sites, having an impregnation amount which is 1.2 times or more of the average impregnation amount, are 20% or more in the substrate.
(8) The composite semipermeable membrane according to any one of (1) to (7), in which the substrate is a long-fiber nonwoven fabric, and an air flow rate of the substrate is 0.5 mL/cm/sec to 5.0 mL/cm$^2$/sec.
(9) The composite semipermeable membrane according to any one of (1) to (8), in which the substrate is a long-fiber nonwoven fabric, and a difference in a degree of fiber orientation between fibers in a surface of the substrate facing the porous supporting layer and fibers in a surface of the substrate opposite to the porous supporting layer is 10° to 90°.
(10) The composite semipermeable membrane according to any one of (1) to (9), in which, when feed water having conditions of a TDS concentration of 3.5%, a boron concentration of 5 ppm, a pH of 6.5, and a temperature of 25° C. permeates the composite semipermeable membrane at an operation pressure of 5.5 MPa, a membrane permeation flux thereof is 0.9 m$^3$/m$^2$/day or more, and a boron removal ratio thereof satisfies the following formula:

(boron removal ratio (%))≥103−10×(membrane permeation flux (m$^3$/m$^2$/day)).

(11) A method for manufacturing a composite semipermeable membrane, including the steps of:
forming a porous supporting layer on a substrate:
forming crosslinked wholly aromatic polyamide on a surface of the porous supporting layer by performing interfacial polycondensation using an aqueous solution of polyfunctional aromatic amine and an organic solvent solution of a polyfunctional aromatic acid halide:
cleaning the obtained crosslinked wholly aromatic polyamide;
bringing the obtained crosslinked wholly aromatic polyamide into contact with a reagent which reacts with a primary amino group to produce a diazonium salt or a derivative thereof;
bringing the obtained crosslinked wholly aromatic polyamide into contact with a reagent which reacts with a diazonium salt or a derivative thereof; and
bringing the obtained crosslinked wholly aromatic polyamide into contact with a solution containing a hydrophilic polymer.
(12) The method for manufacturing a composite semipermeable membrane according to (11), in which, as the reagent which reacts with a diazonium salt or a derivative thereof an aromatic compound having an electron-donating substituent, or a heteroaromatic ring compound having an electron-donating substituent is used.
(13) The method for manufacturing a composite semipermeable membrane according to (11) or (12), in which, as the reagent which reacts with a diazonium salt or a derivative thereof m-phenylenediamine or aniline is used.
(14) The method for manufacturing a composite semipermeable membrane according to any one of (1 1) to (13), in which, as the hydrophilic polymer, a hydrophilic polymer having an average molecular weight of 8,000 or more is used.
(15) The method for manufacturing a composite semipermeable membrane according to any one of (1 1) to (14), in which, as the hydrophilic polymer, polyethylene glycol or a copolymer containing polyethylene glycol is used.

Advantage of the Invention

According to the present invention, it is possible to obtain a composite semipermeable membrane which has stable membrane performance even under a high solute concentration condition.

MODE FOR CARRYING OUT THE INVENTION

1. Composite Semipermeable Membrane

The composite semipermeable membrane of the present invention includes a substrate; a porous supporting layer formed on the substrate; and a separation functional layer formed on the porous supporting layer. Here, the separation functional layer is a polyamide separation functional layer containing crosslinked wholly aromatic polyamide as a main component and containing a carboxy group, the ratio of the carboxy group/an amide group in functional groups contained in the polyamide separation functional layer is 0.40 or more; and the average ratio of oxygen atoms/nitrogen atoms in front and rear sides of the polyamide separation functional layer is 0.95 or less.

(1-1) Substrate

Examples of the substrate include polyester-based polymers, polyamide-based polymers, polyolefin-based polymers, and mixtures or copolymers thereof. Among these, a polyester-based polymer fabric having excellent mechanical and thermal stability is particularly preferable. As the form of the fabric, a long-fiber nonwoven fabric, a short-fiber nonwoven fabric, or a woven and knitted fabric can be preferably used. Here, the long-fiber nonwoven fabric refers to a nonwoven fabric having an average fiber length of 300 mm or more and an average fiber diameter of 3 μm to 30 μm.

Among these fabrics, it is preferable that a long-fiber nonwoven fabric is used because it is possible to sufficiently impregnate the substrate with a polymer solution constituting the porous supporting layer. When the substrate is sufficiently impregnated with the polymer solution, it is possible to improve the adhesiveness to the substrate and increase the physical stability of a microporous supporting membrane. Further, when the substrate is impregnated with the polymer solution, the substitution rate with a non-solvent increases at the time of phase separation for forming the porous supporting layer. As a result, it is possible to suppress the generation of macrovoids. In particular, when the content of the polymer solution constituting the porous supporting layer is 18 wt % or more, the impregnation of the polymer solution into the substrate is suppressed, and the physical stability of a microporous supporting membrane is deteriorated, but it is possible to improve the impregnation of the polymer solution and increase the physical stability of the microporous supporting membrane by using the long-fiber nonwoven fabric.

Further, when the substrate is a long-fiber nonwoven fabric, it is preferable that the difference in the degree of fiber orientation between a surface of the substrate facing the porous supporting layer and a surface of the substrate opposite to the porous supporting layer, that is, the difference in the degree of fiber orientation between a surface layer of the substrate contacting the porous supporting layer and a surface layer of the substrate not contacting the porous supporting layer is 10° to 900. Here, degree of fiber orientation is an index for indicating the direction of fibers of the nonwoven-fabric substrate, and refers to an average angle of fibers constituting the nonwoven-fabric substrate when the direction of membrane production (longitudinal direction: machine direction) at the time of performing continuous membrane production is set to 0°, and the direction (lateral direction: cross direction) perpendicular to the direction of membrane production, that is, the transverse direction of the nonwoven-fabric substrate is set to 90°. In other words, as the degree of fiber orientation is close to 0°, fibers are longitudinally oriented, and as the degree of fiber orientation is close to 90°, fibers are laterally oriented.

Generally, in the case of using a composite semipermeable membrane, the composite semipermeable membrane is used in combination with a permeate channel member such as tricot. The permeate channel member, such as tricot, is used for the purpose of collecting permeate, and has a groove shape in a specific direction. At the time of high pressure operation, the composite semipermeable membrane is depressed into the groove of the permeate channel member to be deformed, so as to deteriorate membrane performance. When the difference in the degree of fiber orientation between the surface layer of the long-fiber nonwoven fabric used as the substrate, facing the porous supporting layer and the surface layer of the long-fiber nonwoven fabric opposite to the porous supporting layer is 10° to 90°, the fiber orientation of the substrate intersects with the groove of the permeate channel member such as tricot, and thus it is possible to prevent the deformation of the composite semipermeable membrane such as the depression of the composite semipermeable membrane into the groove of the permeate channel member, such as tricot, at the time of high-pressure load.

The degree of fiber orientation, for example, can be obtained by the following steps of randomly extracting ten small-piece samples from a nonwoven fabric; observing the surface of each of the samples with a scanning electron microscope at a magnification of 100 to 1000 times; respectively measuring angles when setting the longitudinal direction (machine direction or membrane production direction) of the nonwoven fabric to 0° and setting the traverse direction (cross direction) of the nonwoven fabric to 90°, for ten fibers of each of samples, namely a total of 100 fibers, and rounding off the average value of the measured angles to one decimal point.

Two or more layers of the long-fiber nonwoven fabric are stacked, and thus the fiber orientation of the surface (upper surface) facing the porous supporting layer and the fiber orientation of the surface (lower surface) opposite to the porous supporting layer can be controlled, and the difference in the degree of fiber orientation can be set within the above-described range. Further, the degree of fiber orientation can be controlled by adjusting the spray angle or spray speed of fiber and the angel or speed of a collecting conveyor.

It is preferable that the air flow rate of the substrate is 0.5 mL/cm$^2$/sec to 5.0 mL/cm$^2$/sec. When the air flow rate of the substrate is within the above range, a polymer solution constituting the porous supporting layer is impregnated into the substrate, so that the adhesiveness to the substrate is improved, and the physical stability of the microporous supporting membrane can be increased. Further, when the substrate is impregnated with the polymer solution, the substitution rate of a solvent with a non-solvent increases at the time of phase separation for forming a porous support, compared to the case where the substrate is not impregnated with the polymer solution. As a result, it is possible to suppress the generation of macrovoids. Meanwhile, when the air flow rate of the substrate is too large, the polymer solution is impregnated into the rear side of the substrate to make the thickness of the substrate non-uniform, thus causing performance degradation. In addition, the deformation of the substrate is caused at the time of applying high pressure. The air flow rate of the substrate can be controlled by adjusting the fiber diameter or basis weight of the long-fiber nonwoven fabric.

The thickness of the substrate is within a range of preferably 10 μm to 200 μm, and more preferably 30 μm to 120 μm. The thickness herein means an average value unless otherwise specified. Here, the average value represents an arithmetic average value. In other words, the thickness of the substrate and the porous supporting layer is obtained by determining the average value of thicknesses at 20 points which are measured at intervals of 20 μm in a direction (membrane surface direction) perpendicular to the thickness direction with the cross-sectional observation.

(1-2) Porous Supporting Layer

In the present invention, the porous supporting layer has substantially no ability to separate ions or the like, and is used to provide strength to a separation functional layer having substantial separation performance. The pore size and pore distribution of the porous supporting layer are not particularly limited. However, preferably, the porous supporting layer has uniform fine pores or fine pores whose sizes are gradually increased from one side, on which a separation functional layer is formed, to the other side, and has fine pores which has a size of 0.1 nm to 100 nm and is disposed on one side on which a separation functional layer is formed. Here, the material and the shape thereof are not particularly limited.

Examples of materials of the porous supporting layer include homopolymers or copolymers of polysulfones, polyether sulfones, polyamides, polyesters, cellulose-based polymers, vinyl polymers, polyphenylene sulfide, polyphenylene sulfide sulfone, polyphenylene sulfone and polyphenylene oxide. They may be used alone or as a blend thereof. Here, as cellulose-based polymers, cellulose acetate and cellulose nitrate may be used, and as vinyl polymers, polyethylene, polypropylene, polyvinyl chloride and polyacrylonitrile may be used. Among these materials, homopolymers or copolymers of polysulfones, polyamides, polyesters, cellulose acetates, cellulose nitrates, polyvinyl chloride, polyacrylonitrile, polyphenylene sulfide and polyphenylene sulfide sulfone, are preferable. More preferably, cellulose acetate, polysulfone, polyphenylene sulfide sulfone and polyphenylene sulfone are exemplified. Among these materials, polysulfones are generally used since chemical, mechanical and thermal stability thereof are high and molding thereof can be easily performed.

Specifically, polysulfone constituted of a repeating unit represented by the following chemical formula is preferably used, because the pore diameter of the porous supporting layer can be easily controlled, and the dimensional stability can be improved.

[Chem. 1]

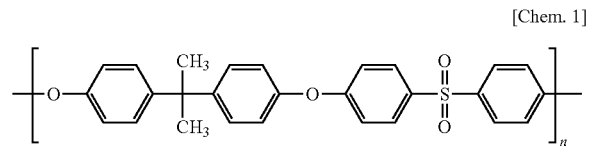

Polysulfone has a mass average molecular weight (Mw) of preferably 10,000 to 200,000, and more preferably 15,000 to 100,000, which is measured by using N-methyl pyrrolidone as a solvent and using polystyrene as a standard substance through gel permeation chromatography (GPC). When the mass average molecular weight (Mw) thereof is 10,000 or more, it is possible to obtain mechanical strength and heat resistance preferable as the porous supporting layer. When the mass average molecular weight (Mw) thereof is 200,000 or less, the viscosity of a solution can be adjusted in the suitable range, and good formability can be realized.

For example, an N,N-dimethylformamide (hereinafter, referred to as DMF) solution of the polysulfone is cast on a densely woven polyester fabric or a nonwoven fabric to predetermined thickness, and the wet coagulation of this solution is carried out in water, thereby obtaining a porous supporting layer, most surface of which has fine pores having a diameter of 10 nm or less.

The thickness of the substrate and the porous supporting layer influences the strength of the composite semipermeable membrane and the packing density in the case of using this composite semipermeable membrane as an element. In order to obtain sufficient mechanical strength and packing density, the sum of the thickness of the substrate and the thickness of the porous supporting layer is preferably 30 μm to 300 μm, and more preferably 100 μm to 220 μm. The thickness of the porous supporting layer is preferably 20 μm to 100 μm. The thickness herein means an average value unless otherwise specified. Here, the average value represents an arithmetic mean value. In other words, the thickness of the substrate and the porous supporting layer is obtained by determining the average value of thicknesses at 20 points which are measured at intervals of 20 μm in a direction (surface direction of membrane) perpendicular to the thickness direction with the cross-sectional observation.

In the case of performing an operation for the purpose of desalination using the composite semipermeable membrane, the porous supporting layer is subjected to deformation such as compression in the thickness direction by pressurization because of a porous structure thereof. The thickness of the composite semipermeable membrane becomes constant by performing water passing treatment at a pressure of 5.5 MPa for 24 hours or more. After passing pure water at a temperature of 25° C. and a pressure of 5.5 MPa for 24 hours or more, the weight of the porous supporting layer per unit volume is preferably 0.50 g/cm$^3$ to 0.65 g/cm$^3$. When the weight thereof per unit volume is within the above-mentioned range, the occurrence of deformation or defect of a membrane separating apparatus using the composite semipermeable membrane even at high pressure load operation is suppressed, and thus permeation flux and solute removal performance can be maintained. The weight thereof per unit volume can be calculated by measuring the weight of the porous supporting layer, which is obtained by physically separating the substrate from the composite semipermeable membrane, and then dividing this value by the volume of the porous supporting layer. The volume of the porous supporting layer is calculated by the separation area of the substrate and the thickness of the porous supporting layer measured by the above-mentioned method.

When the weight of the porous supporting layer per unit volume is 0.65 g/cm$^3$ or less, since the filtration resistance of the porous supporting layer portion can be kept small, it is possible to prevent a decrease in the permeation flux of the composite semipermeable membrane.

In addition, since deformation such as collapse does not occur, defects do not occur even at high pressure load operation, and permeation flux and solute removal performance are stabilized. On the other hand, when the weight of the porous supporting layer per unit volume is 0.5 g/cm$^3$ or more, since defects of the porous supporting layer are decreased, and it is possible to maintain high solute removal performance.

In order to set the weight of the porous supporting layer per unit volume within the above-mentioned range, for example, it is exemplified to control the concentration of a polymer solution which is a material of the porous supporting layer, as described below.

The average impregnation amount of the porous supporting layer into the substrate per unit volume is preferably 1.0 g/cm$^2$ to 5.0 g/cm$^2$, and more preferably 1.5 g/cm$^2$ to 3.0 g/cm$^2$. It is further preferable that sites, having an impregnation amount which is 1.2 times or more of the average impregnation amount, are 20% or more in the substrate. When the average impregnation amount thereof is within the above-mentioned range, it is possible to improve the adhesiveness to the substrate and increase the physical stability of a microporous supporting membrane. Further, when the substrate is impregnated with the polymer solution, the substitution rate of a solvent with a non-solvent increases at the time of phase separation for forming a porous support, compared to the case where the substrate is not impregnated with the polymer solution. As a result, it is possible to suppress the generation of macrovoids. On the other hand, when the impregnation amount is too large, voids of the substrate decrease to deteriorate the permeability of the composite semipermeable membrane.

The average impregnation amount of the porous supporting layer into the substrate per unit volume can be calculated from the weight of the substrate and the area of the substrate before and after the immersion of the substrate in a solvent, after the substrate is immersed in the solvent such that a polymer forming the porous supporting layer is dissolved, so as to elute the polymer.

The average impregnation amount of the porous supporting layer into the substrate per unit volume can be controlled by adjusting the concentration of a polymer solution constituting the porous supporting layer, the air flow rate and orientation degree of the substrate, and the temperature, rate and time for forming the porous supporting layer.

The form of the porous supporting layer can be observed by a scanning electron microscope, a transmission electron microscope, or an atomic force microscope. For example, in order to observe the porous supporting layer using a scanning electron microscope, after the porous supporting layer is separated from the substrate, this porous supporting layer is cut by a freeze-fracture method, and this resulting product is used as a sample of cross-section observation. This sample is thinly coated with platinum, platinum-palladium, or ruthenium tetrachloride, and preferably ruthenium tetrachloride, and is observed with a high-resolution field emission scanning electron microscope (UHR-FE-SEM) at an accelerating voltage of 3 kV to 6 kV. As the high-resolution field emission scanning electron microscope, S-900 type electron microscope, manufactured by Hitachi, Ltd., or the like can be used. The thickness and surface pore diameter of the porous supporting layer is determined from the obtained electron microscope photograph. Here, the thickness or the pore diameter in the present invention means an average value, but the maximum pore diameter means a maximum value within the observation range.

The porous supporting layer used in the present invention can be selected from various commercially available materials such as "Millipore filter VSWP" (trade name) manufactured by Millipore Corporation, "Ultra filter UK10" (trade name) manufactured by Toyo Roshi Kaisha Ltd., and the like. However, this porous supporting layer can also be manufactured according to the method described in "Office of Saline Water Research and Development Progress Report" No. 359 (1968).

(1-3) Separation Functional Layer

In the present invention, the separation functional layer contains crosslinked wholly aromatic polyamide as a main component. The main component refers to a component whose content ratio is 50% or more in the total components of the separation functional layer. When the separation functional layer contains crosslinked wholly aromatic polyamide in an amount of 50% or more, it is easy to exhibit high membrane performance. Further, the crosslinked wholly aromatic polyamide can be formed by interfacial polycondensation of polyfunctional aromatic amine and polyfunctional aromatic acid halide. Here, it is preferable that at least one of polyfunctional aromatic amine and polyfunctional aromatic acid halide contains tri- or higher functional compound. Further, In order to obtain sufficient separation performance and permeate amount, generally, the thickness of the separation functional layer is within a range of 0.01 μm to 1 μm, and preferably 0.1 μm to 0.5 μm. Hereinafter, the separation functional layer in the present invention is also referred to as a polyamide separation functional layer.

The polyfunctional aromatic amine refers to an aromatic amine which has two or more amino groups of at least one of primary amino groups and secondary amino groups in one molecule thereof and in which at least one of the amino groups is a primary amino group. Examples thereof includes: polyfunctional aromatic amines in which two amino groups are bonded to an aromatic ring in any positional relationship of ortho-, meta- and para-position, such as o-phenylenediamine, m-phenylenediamine, p-phenylenediamine, o-xylylenediamine, m-xylylenediamine, p-xylylenediamine, o-diaminopyridine, m-diaminopyridine, and p-diaminopyridine; and polyfunctional aromatic amines, such as 1,3,5-triaminobenzene, 1,2,4-triaminobenzene, 3,5-diamino benzoic acid, 3-aminobenzylamine, and 4-aminobenzylamine. Among these, considering the selective separation properties, permeability and heat resistance of a membrane, m-phenylenediamine, p-phenylenediamine, and 1,3,5-triaminobenzene are suitably used. Among these, in view of easy availability and easy handling, m-phenylenediamine (hereinafter, also referred to as m-PDA) is more preferably used. These polyfunctional aromatic amines may be used alone or in combination of two or more thereof.

The polyfunctional aromatic acid halide refers to an aromatic acid halide which has at least two halogenated carbonyl groups in one molecule thereof. An example of trifunctional acid halide includes trimesic acid chloride. Examples of difunctional acid halide include biphenyl dicarboxylic acid dichloride, azobenzene dicarboxylic acid dichloride, terephthalic acid chloride, isophthalic acid chloride, and naphthalenedicarboxylic acid chloride. Considering the reactivity with polyfunctional aromatic amine, the polyfunnctional aromatic acid halide is preferably polyfunctional aromatic acid chloride. Further, considering the selective separation properties and heat resistance of a membrane, polyfunctional aromatic acid chloride having 2 to 4 chloride carbonyl groups in one molecule thereof is preferable. Among these, in view of easy availability and easy handling, trimesic acid chloride is more preferably used. These polyfunctional aromatic acid halides may be used alone or in combination of two or more thereof.

An amide group derived from the polymerization of polyfunctional aromatic amine and polyfunctional aromatic acid halide, and an amino group and a carboxy group derived from an unreacted functional group exist in the polyamide separation functional layer. In addition to these groups, other functional groups contained in polyfunctional aromatic amine or polyfunctional aromatic acid halide exist in the polyamide separation functional layer. Further, a new functional group can also be introduced by chemical treatment. When chemical treatment is performed, a functional group can be introduced into the polyamide separation functional layer, and thus the performance of the composite semipermeable membrane can be improved. Examples of the new function group include an alkyl group, an alkenyl group, an alkynyl group, a halogen group, a hydroxyl group, an ether group, a thioether group, an ester group, an aldehyde group, a nitro group, a nitroso group, a nitrile group, and an azo group. For example, it is possible to introduce a chlorine group by treatment with aqueous solution of sodium hypochlorite. Further, it is possible to introduce a halogen group by the Sandmeyer reaction through the production of a diazonium salt. Furthermore, it is possible to introduce an azo group by performing an azo coupling reaction through the production of a diazonium salt.

The present inventors found that the combination of these functional groups or the difference in the amount between these functional groups influences the permeation flux of the membrane, solute removal ratio of the membrane, and performance stability under a high solute concentration condition of the membrane.

At the time of high pressure operation of the membrane, the solute concentration in the vicinity of the surface of the polyamide separation functional layer increases. At this time, when the polyamide separation functional layer is brought into contact with feed water having high solution concentration, there is a concern that permeation flux or solute removal performance is deteriorated. Therefore, it is important to provide a separation functional layer which satisfies the amount of functional groups or the combination conditions of functional groups without deteriorating permeation flux or solute removal performance even when the separation functional layer is brought into contact with feed water having high solution concentration.

The present inventors have repeated extensive studies. As a result, they found that, when the ratio of (molar equivalent of a carboxy group)/(molar equivalent of an amide group) in the polyamide separation functional layer is 0.40 or more and the average ratio of oxygen atoms/nitrogen atoms in front and rear sides of the polyamide separation functional layer is 0.95 or less, membrane performance can be maintained even under the condition that the solute concentration increases during high-pressure operation.

Here, the ratio of (molar equivalent of a carboxy group)/(molar equivalent of an amide group) is used as the indication of degree of crosslinkage, and means that the greater the numerical value, the lower the degree of crosslinkage. When the ratio of (molar equivalent of a carboxy group)/(molar equivalent of an amide group) is 0.40 or more, the hydrophilicity, that is, permeability of the polyamide separation functional layer can be maintained, and a membrane having high permeation flux can be obtained. The ratio thereof is more preferably 0.45 or more. On the other hand, in order to maintain the salt rejection ratio, the upper limit thereof is preferably 0.60 or less.

Further, the average ratio of oxygen atoms/nitrogen atoms in front and rear sides of the polyamide separation functional layer is preferably 0.95 or less, and more preferably 0.90 or less. The lower limit thereof is preferably 0.80 or more. When the average ratio of oxygen atoms/nitrogen atoms in front and rear sides of the polyamide separation functional layer is within the above-mentioned range, a membrane having small performance variation at the time of contacting with high solution concentration and having high stability can be obtained. Although the reason for this is not clear, it is considered that the polyamide separation functional layer is not easily influenced even at the time of contacting with high solution concentration because the amount of oxygen atoms, which are easy to interact with metal ions existing in the solute, is small.

As the functional group in the polyamide separation functional layer, it is preferable that the amount of functional groups which are to be ionized under a weak alkaline condition, such as seawater, or a high solution concentration condition is small. Particularly, it is preferable that the ratio of (molar equivalent of a phenolic hydroxyl group)/(molar equivalent of an amide group) is 0.10 or less. When the ratio of (molar equivalent of a phenolic hydroxyl group)/(molar equivalent of an amide group) is 0.10 or less, the content ratio of functional groups ionized even at the time of contacting with feed water having high solute concentration is small, and thus it is possible to maintain membrane performance.

The ratio of (molar equivalent of a carboxy group)/(molar equivalent of an amide group), the ratio of oxygen atoms/nitrogen atoms, and the ratio of (molar equivalent of a phenolic hydroxyl group)/(molar equivalent of an amide group) can be controlled, for example, based on the kind and amount of functional groups introduced by the chemical treatment of the polyamide functional group.

The amount of functional groups in the polyamide separation functional layer can be measured, for example, using a $^{13}C$ solid-state NMR method. Specifically, a substrate is separated from a composite semipermeable membrane to obtain a polyamide separation functional layer and a porous supporting layer, and then the porous supporting layer is dissolved and removed to obtain a polyamide separation functional layer. The measurement of the obtained polyamide separation functional layer is performed by a DD/MAS-$^{13}C$ solid-state NMR method, and the ratio of each functional group can be calculated from the comparison of integral value of the carbon peak of each functional group or the peak of carbon bonded to each functional group.

The element ratio of the polyamide separation functional layer, for example, can be analyzed using X-ray photoelectron spectroscopy (XPS). Specifically, the element ratio thereof can be obtained using the X-ray photoelectron spectroscopy (XPS) illustrated in the "Journal of Polymer Science", Vol. 26, 559-572 (1988) and the "Journal of the Adhesion Society of Japan", Vol. 27, No. 4 (1991).

The front and rear sides of the polyamide separation functional layer refer to both sides of front surface of the polyamide separation functional layer and rear surface of the polyamide separation functional layer (that is, side of the polyamide separation functional layer facing the porous supporting layer). The ratio of oxygen atoms/nitrogen atoms on the front surface of the polyamide separation functional layer can be directly measured using XPS.

The ratio of oxygen atoms/nitrogen atoms on the rear surface of the polyamide separation functional layer can be measured using XPS after performing the steps of: separating a substrate from a composite semipermeable membrane; fixing the front surface of a polyamide separation functional layer to a suitable member; and dissolving and removing a porous supporting layer using a solvent for dissolving the porous supporting layer to expose the rear surface of the polyamide separation functional layer. Then, the average value of the ratio of oxygen atoms/nitrogen atoms on the front surface of the polyamide separation functional layer and the ratio of oxygen atoms/nitrogen atoms on the rear surface of the polyamide separation functional layer is obtained.

The surface of the composite semipermeable membrane of the present invention can be coated with a hydrophilic polymer after the formation of the polyamide separation functional layer. When the surface thereof is coated with the hydrophilic polymer, solute removal performance and performance stability under a high solute concentration condition are improved.

The hydrophilic polymer may be bonded with the polyamide separation functional layer through a covalent bond, and may also be bonded with the polyamide separation functional layer through a non-covalent bond such as a hydrogen bond or intermolecular force. The coating method of the hydrophilic polymer is not particularly limited as long as the hydrophilic polymer exists on the polyamide separation functional layer. The fact that the hydrophilic polymer exists on the polyamide separation functional layer can be confirmed by a membrane surface analysis technique such as XPS, time-of-flight secondary ion mass spectrometer (TOF-SIMS), or total reflection infrared spectroscopy (ATR-FTIR).

In the present invention, the hydrophilic polymer refers to a polymer which can be dissolved in 1 L of water (25° C.) in an amount of 0.1 g or more. Examples of the hydrophilic polymer include polyvinyl pyrrolidone, polyvinyl alcohol, polyethylene glycol, polyacrylic acid, polyethylene imine, polyoxazoline, polyallylamine, and carboxymethyl cellulose. The block copolymers, graft copolymers, and random copolymers of these hydrophilic polymers may be also be used. The block copolymers, graft copolymers, and random copolymers of these hydrophilic polymers and other hydrophobic polymers may also be used. These hydrophilic polymers may be used alone or in mixtures thereof. Among these hydrophilic polymers, particularly, when the composite semipermeable membrane is coated with polyethylene glycol (hereinafter, referred to as PEG) or a copolymer containing polyethylene glycol it is preferable since solute removal performance and performance stability under a high solute concentration condition are improved.

The average molecular weight (number average molecular weight) of the hydrophilic polymer is preferably 2,000 or more, and more preferably 8,000 or more since solute removal performance and performance stability under a high solute concentration condition are improved.

2. Method for Manufacturing Composite Semipermeable Membrane

Next, a method for manufacturing the above-mentioned composite semipermeable membrane will be described. This manufacturing method includes a step of forming a supporting membrane including a substrate and a porous supporting layer and a step of forming a separation functional layer.

(2-1) Method for Manufacturing a Supporting Membrane

The step of forming a supporting membrane may include the steps of applying a polymer solution, as a component of a porous supporting layer, onto a substrate; impregnating the substrate with the polymer solution; and immersing the porous substrate impregnated with the polymer solution into a coagulation bath which has lower solubility of the polymer as compared to a good solvent for the polymer, thereby coagulating the polymer to form a three-dimensional network structure. The step of forming a supporting membrane may further include the steps of dissolving a polymer, as a component of the porous supporting layer, in a good solvent for the polymer to prepare a polymer solution.

In order to obtain a supporting membrane having a predetermined structure, it is important to control the impregnation of the polymer solution into the substrate. Examples of methods for controlling the impregnation of the polymer solution into the substrate include a method of controlling the time period from the application of the polymer solution onto the substrate to the immersion in a non-solvent and a method of controlling the temperature or concentration of the polymer solution to thereby adjust the viscosity thereof. These methods can be used in combination.

Further, in order to obtain a porous supporting layer having a predetermined structure, it is important to control the phase separation of the polymer solution. For example, it is important to control polymer concentration, a solvent, or a coagulation bath liquid.

When the polymer solution contains polysulfone as a material of the porous supporting layer, the concentration of polysulfone in the polymer solution is preferably 18 wt % or more. When the concentration of polysulfone in the polymer is 18 wt % or more, pores become dense, so as to suppress the formation of macrovoids. It is preferable that the concentration of polysulfone in the polymer solution is 25 wt % or less in order to obtain a sufficient amount of permeate.

Here, the solvent contained in the polymer solution may be any good solvent for the polymer. The good solvent of the present invention refers to a solvent capable of dissolving a polymer material. Examples of the good solvent include: lower alkyl ketones, esters, and amides, such as N-methyl-2-pyrrolidone, dimethyl sulfoxide, dimethylacetamide, dimethylformamide, methyl ethyl ketone, acetone, tetrahydrofuran, tetramethyl urea, and trimethyl phosphate; and mixed solvents thereof. Examples of non-solvents include: water; aliphatic hydrocarbons, aromatic hydrocarbons, aliphatic polyhydric alcohols, aromatic polyhydric alcohols, and chlorinated hydrocarbons, such as hexane, pentane, benzene, toluene, methanol ethanol, carbon tetrachloride, o-dichlorobenzene, trichloroethylene, ethylene glycol, diethylene glycol, triethylene glycol, propylene glycol butylene glycol pentanediol, hexanediol and low-molecular-weight polyethylene glycol; or other chlorinated organic liquids and mixed solvents thereof.

The polymer solutions may contain additives for adjusting the pore diameter, porosity, hydrophilicity, elastic modulus, etc. of the porous supporting layer. Examples of additives for adjusting pore diameter and porosity include: water; alcohols; hydrophilic polymers such as polyethylene glycol, polyvinylpyrrolidone, poly(vinyl alcohol), and poly (acrylic acid), or salts thereof; inorganic salts such as lithium chloride, sodium chloride, calcium chloride, and lithium nitrate; and formaldehyde and formamide. However, the additives are not limited to these examples. Examples of additives for adjusting hydrophilicity and elastic modulus include various surfactants.

As the coagulation bath, water is usually used. However, the coagulation bath may be a coagulation bath that does not dissolve the polymer. The membrane form of the porous supporting layer is changed depending on the composition, thereby also changing the membrane-forming properties of a composite membrane. The temperature of the coagulation bath is preferably −20° C. to 100° C., and more preferably 10° C. to 30° C. When the temperature thereof is equal to or less than 100° C., thermal motion is gentle, and the vibration of the surface of the coagulation bath is not intensified, so that it is easy to maintain the smoothness of the membrane surface after the membrane formation. In addition, when the temperature thereof is equal to or greater than 20° C., coagulation speed is not slow, and thus membrane-forming properties are improved.

Further, it is important to control the impregnation of the polymer solution into the substrate. In order to control the impregnation of the polymer solution into the substrate, for example, there is a method of controlling the time period from the application of the polymer solution onto the substrate to the immersion in a non-solvent.

It is preferable that the time period from the application of the polymer solution onto the substrate to the immersion in the coagulation bath is generally in a range of 0.1 seconds to 5 seconds. When the time until the substrate coated with the polymer solution is immersed in the coagulation bath is within the above-mentioned range, the organic solvent solution containing the polymer is sufficiently impregnated between the fibers of the substrate, and is then solidified. As a result, the porous supporting layer is firmly bonded to the substrate by an anchor effect, and thus it is possible to obtain the porous supporting layer of the present invention. Here, the preferable range of the time until the substrate coated with the polymer solution is immersed in the coagulation bath may be suitably adjusted based on the viscosity or the like of the used polymer solution.

Next, the porous supporting layer obtained under such preferable conditions is cleaned with hot water in order to remove the membrane formation solvent remaining in the membrane. The temperature of this hot water is preferably 50° C. to 100° C. and more preferably 60° C. to 95° C. In case where the temperature thereof is higher than this range, the porous supporting layer contracts to a higher degree, resulting in a decrease in permeability. Conversely, in case where the temperature thereof is too low, the cleaning effect is insufficient.

(2-2) Method of Forming Separation Functional Layer

Next, a step of forming a separation functional layer constituting the composite semipermeable membrane will be described. The step of forming a separation functional layer includes the steps of:

(a) forming crosslinked wholly aromatic polyamide on the surface of a porous supporting layer by performing interfacial polycondensation using an aqueous solution containing polyfunctional aromatic amine and an organic solvent solution containing a polyfunctional aromatic acid halide;

(b) cleaning the obtained crosslinked wholly aromatic polyamide;

(c) bringing the obtained crosslinked wholly aromatic polyamide into contact with a reagent which reacts with a primary amino group to produce a diazonium salt or a derivative thereof;

(d) bringing the obtained crosslinked wholly aromatic polyamide into contact with a reagent which reacts with a diazonium salt or a derivative thereof; and (e) bringing the obtained crosslinked wholly aromatic polyamide into contact with a solution containing a hydrophilic polymer.

Hereinafter, the step of forming a separation functional layer will be described in order of (a), (b), (c), (d), and (e).

In the step (a), the concentration of polyfunctional aromatic amine in the aqueous solution of polyfunctional aromatic amine is preferably 0.1 wt % to 20 wt %, and more preferably 0.5 wt % to 15 wt %. When the concentration of polyfunctional aromatic amine is within the above-mentioned range, it is possible to obtain sufficient solute removal performance and permeability. In the aqueous solution of polyfunctional aromatic amine, a surfactant, an organic solvent, an alkaline compound or an antioxidant etc. may be contained as long as it does not inhibit the reaction of polyfunctional aromatic amine with polyfunctional aromatic acid halide. The surfactant is effective in improving the wettability of the surface of a supporting membrane to reduce the interfacial tension between the aqueous solution of polyfunctional aromatic amine and a non-polar solvent. The organic solvent may act as a catalyst for an interfacial polycondensation reaction, and thus there is a case where the efficiency of the interfacial polycondensation reaction efficiency can be made better by the addition thereof.

In order to perform the interfacial polycondensation on the porous supporting layer, first, the above-mentioned aqueous solution of polyfunctional aromatic amine is brought into contact with the porous supporting layer. It is preferable that the contact is uniformly and continuously performed on the porous supporting layer. Specifically, for example, there is exemplified a method of coating the porous supporting layer with the aqueous solution of polyfunctional aromatic amine or a method of immersing the porous supporting layer into the aqueous solution of polyfunctional aromatic amine. The contact time between the porous supporting layer and the aqueous solution of polyfunctional aromatic amine is preferably 1 second to 10 minutes, and more preferably 10 seconds to 3 minutes.

After the aqueous solution of polyfunctional aromatic amine is brought into contact with the porous supporting layer, liquid removal is sufficiently carried out such that droplets do not remain on a membrane. When liquid removal is sufficiently carried out, it is possible to prevent the membrane performance deterioration such as membrane defects caused by the droplet remaining portion after the formation of the porous supporting layer. As the liquid removal method, for example, as described in JP-A-02-78428, a method of naturally removing the excessive aqueous solution of polyfunctional aromatic amine by gripping the supporting membrane in the vertical direction after the contact of the aqueous solution of polyfunctional amine, or a method of forcibly removing the excessive aqueous solution of polyfunctional aromatic amine by blowing air flow such as nitrogen from an air nozzle can be used. Further, after the liquid removal, the moisture of the aqueous solution can be partially removed by drying the surface of the membrane.

Next, after the porous supporting layer is brought into contact with the aqueous solution of polyfunctional aromatic amine, an organic solvent solution containing polyfunctional aromatic acid halide is brought into contact with the porous supporting layer, thereby forming the skeleton of a crosslinked wholly aromatic polyamide separation functional layer by interfacial polycondensation.

The concentration of the polyfunctional acid halide in the organic solvent solution is within a range of preferably 0.01 wt % to 10 wt %, and more preferably 0.02 wt % to 2.0 wt %. When the concentration thereof is 0.01 wt % or more, sufficient reaction rate can be obtained, and when the concentration thereof is 10 wt % or less, the occurrence of side reactions can be suppressed. Meanwhile, when the organic solvent solution further contains an acylation catalyst such as DMF, interfacial polycondensation can be accelerated, thus which is further preferable.

It is desired that the organic solvent is immiscible with water, dissolves polyfunctional acid halide, and does not destroy the supporting membrane, and any organic solvent may be used as long as it is inert to the polyfunctional amine compound and the polyfunctional acid halide. Preferred examples of the organic solvent include hydrocarbon compounds, such as n-hexane, n-octane, and n-decane.

The method of bringing the organic solvent solution of polyfunctional aromatic acid halide into contact with an aqueous solution phase of polyfunctional aromatic amine compound may be performed in the same manner as a method of applying the polyfunctional aromatic amine solution onto the porous supporting layer. Interfacial polycondensation is performed by the contact of the organic solvent solution of polyfunctional aromatic acid halide to form a crosslinked polyamide-containing separation functional layer on the porous supporting layer, and then the excess solvent may be removed. As the liquid removal method, for example, a method of naturally removing the excessive organic solvent by gripping a membrane in the vertical direction can be used. In this case, the time required for gripping the membrane is preferably 1 minute to 5 minutes, and more preferably 1 minute to 3 minutes. When the time is too short, a separation functional layer is not completely formed, and when the time is too long, the organic solvent is excessively dried, whereby defects are likely to be occurred to cause performance deterioration.

Next, in the step (b), the composite semipermeable membrane is hydrothermally treated at a temperature of 40° C. to 100° C., preferably, 60° C. to 100° C., for 1 minute to 10 minutes, preferably, 2 minutes to 8 minutes, thereby further improving the salt removal ratio and born removal ratio of the composite semipermeable membrane.

In the step (c), the composite semipermeable membrane is brought into contact with a reagent which reacts with a primary amino group to produce a diazonium salt or a derivative thereof. As the reagent which is to be contacted and which reacts with a primary amino group to produce a diazonium salt or a derivative thereof, there is exemplified an aqueous solution of nitrous acid and a salt thereof or a nitrosyl compound. Since the aqueous solution of nitrous acid or a nitrosyl compound generates gas to be easily decomposed, for example, it is preferable that the nitrous acid is sequentially generated by the reaction of nitrite and an acidic solution. Generally, nitrite reacts with hydrogen ions to produce nitrous acid ($HNO_2$), but nitrous acid ($HNO_2$) is efficiently produced when the pH of the aqueous solution is 7 or lower, preferably 5 or lower, and more preferably 4 or lower. From the viewpoint of ease of handling, an aqueous solution of sodium nitrite, which is obtained by reacting with hydrochloric acid or sulfuric acid in an aqueous solution, is particularly preferable.

The concentration of nitrous acid and nitrite in the reagent which reacts with a primary amino group to produce a diazonium salt or a derivative thereof is preferably 0.01 wt % to 1 wt %, and more preferably 0.05 wt % to 0.5 wt %. When the concentration thereof is 0.01 wt % or more, sufficient effects can be obtained, and when the concentration thereof is 1 wt % or less, a solution can be easily handled.

The temperature of the aqueous solution of nitrous acid is preferably 15° C. to 45° C. When the temperature thereof is 15° C. or higher, sufficient reaction time can be obtained, and when the temperature thereof is 45° C. or lower, handling is easy because the decomposition of nitrous acid does not easily occurs.

The contact time with the aqueous solution of nitrous acid may be time required for producing at least one of diazonium salts and derivatives thereof. The contact time is short at high concentration, but is required to be long at low concentration. Therefore, in the solution of the above-mentioned concentration, the contact time is preferably within 10 minutes, and more preferably within 3 minutes. The contacting method is not particularly limited, and a method of applying the solution of the reagent onto the composite semipermeable membrane or a method of immersing the composite semipermeable membrane into the solution of the reagent may be used. As the solvent to dissolve the reagent, any solvent may be used as long as it dissolves the reagent and does not erode the composite semipermeable membrane. Further, the solution may further contain a surfactant, an acidic compound or an alkaline compound etc. as long as this additive does not inhibit the reaction of the primary amine group and the reagent.

Subsequently, in the step (d), the composite semipermeable membrane is brought into contact with a reagent which reacts with a diazonium salt or a derivative thereof. Examples of the reagent to be used herein include chloride ion, bromide ion, cyanide ion, iodide ion, fluoboric acid, hypophosphorous acid, sodium hydrogen sulfite, sulfite ion, aromatic compounds, hydrogen sulfide, and thiocyanic acid. In the step (c), a part of the diazonium salt or derivative thereof produced on the composite semipermeable membrane is converted into a phenolic hydroxyl group by the reaction with water. In this case, when the composite semipermeable membrane is brought into contact with an aqueous solution containing the reagent which reacts with the diazonium salt or derivative thereof it is possible to suppress the conversion into the phenolic hydroxyl group.

For example, by contacting an aqueous solution containing copper chloride (I), copper bromide (I) or potassium iodide, a halogen atom corresponding to each component is introduced. Further, by contacting an aromatic compound, a diazo coupling reaction occurs, and thus an aromatic ring is introduced through an azo bond. Meanwhile, these reagents may be used alone or in a mixture of two or more thereof and different reagents may be contacted several times. Among these reagents, particularly, when an aromatic compound causing an azo coupling reaction is used, the boron removal ratio of the composite semipermeable membrane is greatly improved, thus which is preferable. The reason for this is considered that an aromatic ring to be introduced in place of an amino group by a diazo coupling reaction becomes bulky, and thus an effect of clogging the pores existing in the separation functional layer becomes higher.

As the aromatic compound causing a diazo coupling reaction, there is exemplified a compound having an electro-rich aromatic ring or heteroaromatic ring. Examples of the compound having an electro-rich aromatic ring or heteroaromatic ring include an unsubstituted heteroaromatic ring compound, an aromatic compound having an electron-donating substituent, and a heteroaromatic ring compound having an electron-donating substituent. Examples of the electron-donating substituent include an amino group, an ether group, a thioether group, an alkyl group, an alkenyl group, an alkynyl group, and an aryl group. Specific examples of the above compounds include aniline, methoxyaniline which is bonded with a benzene ring at any position of ortho-position, meta-position and para-position thereof phenylenediamine in which two amino groups are bonded with a benzene ring at any position of ortho-position, meta-position and para-position thereof 1,3,5-triaminobenzene, 1,2,4-triaminobenzene, 3,5-diamino benzoic acid, 3-amino-benzylamine, 4-amino-benzylamine, sulfanilic acid, 3,3'-dihydroxybenzidine, 1-amino-naphthalene, 2-amino-naphthalene, and N-alkylated products of these compounds.

The concentration and time required for contacting the reagent which reacts with a diazonium salt or a derivative thereof can be suitably adjusted in order to obtain the desired effect. The contact temperature is preferably 15° C. to 45° C. When the contact temperature is lower than 15° C., the progress of a diazo coupling reaction is slow, and thus a phenolic hydroxyl group is generated by a side reaction with water, thus which is not preferable. When the contact temperature is higher than 45° C., the shrinkage of the polyamide separation functional layer occurs, and thus the permeate amount decreases, thus which is not preferable.

Finally, in the step (e), the composite semipermeable membrane is brought into contact with a solvent containing a hydrophilic polymer to coat the separation functional layer with the hydrophilic polymer. In the present invention, the hydrophilic polymer refers to a polymer which can be dissolved in 1 L of water (25° C.) in an amount of 0.1 g or more. Examples of the hydrophilic polymer include polyvinyl pyrrolidone, polyvinyl alcohol polyethylene glycol, polyacrylic acid, polyethylene imine, polyoxazoline, polyallylamine, and carboxymethyl cellulose. The block copolymers, graft copolymers, and random copolymers of these hydrophilic polymers may also be used. The block copolymers, graft copolymers, and random copolymers of these hydrophilic polymers and hydrophobic polymers may also be used. These hydrophilic polymers may be used alone or in mixtures with two or more thereof. When the composite semipermeable membrane is brought into contact with an aqueous solution containing the PEG selected from among these hydrophilic polymers, it is preferable in view of improving salt removal ratio and boron removal ratio.

The concentration of the hydrophilic polymer is preferably 1 ppm to 1000 ppm. When the concentration thereof is less than 1 ppm, it is not preferable because the effect of improving the salt removal ratio and boron removal ratio of the composite semipermeable membrane is low. In contrast, when the concentration thereof is more than 1000 ppm, it is not preferable because the water permeability of the composite semipermeable membrane deteriorates.

The temperature of the solution containing the hydrophilic polymer is preferably 15° C. to 45° C. When the temperature thereof is lower than 15° C., it is not preferable because the solubility of the hydrophilic polymer decreases. When the temperature thereof is higher than 45° C., it is not preferable because the separation functional layer is contracted, and thus the water permeability of the composite semipermeable membrane deteriorates.

The time required for bringing the composite semipermeable membrane into contact with the solution containing the hydrophilic polymer is preferably 1 second to 24 hours, but can be suitably adjusted based on the concentration of the hydrophilic polymer. When the time is less than 1 second, it is not preferable because the effect of improving the salt removal ratio and boron removal ratio of the composite semipermeable membrane is low. In contrast, when the time is more than 24 hours, it is not preferable because the water permeability of the composite semipermeable membrane deteriorates.

The method for bringing the composite semipermeable membrane into contact with the solution containing the hydrophilic polymer is not particularly limited. For example, a method of applying the solution containing the hydrophilic polymer onto the composite semipermeable membrane using a bar coater, a die coater, a gravure coater or a sprayer, or a method of immersing the composite semipermeable membrane into the solution containing the hydrophilic polymer may be used. The solution may further contain an acidic compound, an alkaline compound, a surfactant, or an antioxidant in addition to the hydrophilic polymer.

The composite semipermeable membrane of the present invention can be used in the following manner. The composite semipermeable membrane is wound around a cylindrical collecting pipe having a large number of pores, together with a feed water channel member such as a plastic net, a permeate channel member such as tricot, and a film optionally used for enhancing pressure resistance, thereby fabricating a spiral type composite semipermeable membrane element. Furthermore, such elements can be connected serially or in parallel and housed in a pressure vessel, thereby configuring a composite semipermeable membrane module.

Moreover, the above composite semipermeable membrane, the element thereof, or the module can be combined with a pump for supplying feed water thereto, an apparatus for pretreating the feed water, etc., thereby configuring a fluid separator. By using this separator, feed water can be separated into permeate such as potable water, and concentrate which has not passed through the membrane. Thus, water suitable for a purpose can be obtained.

Examples of the feed water to be treated with the composite semipermeable membrane include liquid mixtures having a TDS (total dissolved solids) of 500 mg/L to 100 g/L, such as seawater, brackish water, and wastewater. In general, TDS means the total content of dissolved solids, and is expressed by "weight/volume" or "weight ratio". According to a definition, the content can be calculated from the weight of a residue obtained by evaporating, at a temperature of 39.5° C. to 40.5° C., a solution which has been filtered through a 0.45-micron filter. However, a simpler method is to convert from practical salinity (S).

Higher operation pressures for the fluid separator are effective in improving the solute removal ratio. However, in view of the resultant increase in the amount of energy necessary for the operation and in view of the durability of the composite semipermeable membrane, the operation pressure at the time when water to be treated is passed through the composite semipermeable membrane is preferably 0.5 MPa to 10 MPa. With respect to the temperature of the feed water, the solute removal ratio decreases as the temperature thereof rises. However, as the temperature thereof declines, the membrane permeation flux decreases. Consequently, the temperature thereof is preferably 5° C. to 45° C. With respect to the pH of the feed water, too high pH values thereof result in a concern that, in the case of feed water having a high solute concentration, such as seawater, scale of magnesium or the like might occur. There also is a concern that the membrane might deteriorate due to high-pH operation. Consequently, it is preferable that the separator should be operated in a neutral range.

It is preferable that the composite semipermeable membrane of the present invention satisfies the following condition of membrane permeation flux, that is, water permeability, and boron removal ratio. That is, when feed water having conditions of a TDS concentration of 3.5%, a boron concentration of 5 ppm, a pH of 6.5 and a temperature of 25° C. permeates the composite semipermeable membrane at an operation pressure of 5.5 MPa, the membrane permeation flux thereof is 0.9 m$^3$/m$^2$/day or more, and the boron removal ratio thereof satisfies the following formula:

boron removal ratio (%)≥103−10×membrane permeation flux (m$^3$/m$^2$/day).

When the membrane permeation flux and boron removal ratio are within the above range, at the time of seawater desalination operation, it is possible to provide permeate having high desalination amount and low boron residual amount.

EXAMPLES

Hereinafter, the present invention will be described in more detail with reference to the following Examples, but the scope of the present invention is not limited to these Examples.

The various characteristics of the composite semipermeable membrane were obtained by measuring the quality of permeate and feed water after supplying seawater (TDS concentration: 3.5%, boron concentration: about 5 ppm), adjusted to a temperature of 25° C. and a pH of 6.5, to the composite semipermeable membrane at an operation pressure of 5.5 MPa and then performing membrane filtration treatment for 24 hours.

(Solute Removal Ratio (TDS Removal Ratio))

TDS removal ratio (%)=100×{1−(TDS concentration in permeate/TDS concentration in feed water)}

(Membrane Permeation Flux)

The membrane permeation rate of feed water (seawater) is represented by a membrane permeation flux (m$^3$/m$^2$/day) which is expressed by a permeate amount (cubic meter) per a membrane surface of square meter and per day.

(Boron Removal Ratio)

The boron removal ratio of the composite semipermeable membrane was determined by the following equation after analyzing the concentration of boron in the feed water and permeate using an ICP emission spectrometer (P-4010, manufactured by Hitachi. Ltd.).

Boron removal ratio (%)=100×{1−(boron concentration in permeate/boron concentration in feed water)}

(Degree of Fiber Orientation of Substrate)

The degree of fiber orientation of the substrate was obtained by the following steps of: randomly extracting ten small-piece samples from a nonwoven fabric, observing each of the samples with a scanning electron microscope at a magnification of 100 to 1,000 times; respectively measuring angles when setting the longitudinal direction (machine direction) of the nonwoven fabric to 0° and setting the lateral direction (cross direction) of the nonwoven fabric to 90°, for ten fibers of each of samples, namely a total of 100 fibers; and rounding off the average value of the measured angles to one decimal point.

(Weight of Porous Supporting Layer Per Unit Volume)

The composite semipermeable membrane was cut to an area of 44.2 cm$^2$, pure water passed through the composite semipermeable membrane at a temperature of 25° C. and a pressure of 5.5 MPa for 24 hours, and then the composite semipermeable membrane was dried under vacuum. There-after, the weight and thickness of the composite semipermeable membrane were measured, and the substrate was separated from the composite semipermeable membrane. The weight and thickness of the substrate was measured, and the weight of the supporting layer per unit volume was calculated by the following equation.

Weight of supporting layer per unit volume (g/cm³)=
(weight of composite semipermeable membrane−weight of substrate)/(area of composite semipermeable membrane−(thickness of composite semipermeable membrane−thickness of substrate))

(Average Impregnation Amount of Porous Supporting Layer into Substrate Per Unit Area)

A composite semipermeable membrane having arbitrary 50 points in an area of 5 cm×5 cm was dried under vacuum, and then a substrate was separated from the composite semipermeable membrane. The substrate was immersed in a DMF solution for 24 hours, cleaned, and then dried under vacuum to calculate the average impregnation amount of a porous supporting layer into the substrate per unit area from the following equation.

Average impregnation amount=weight of substrate before DMF immersion−weight of substrate after DMF immersion In addition, among the arbitrary 50 points, the percentage of sites having an impregnation amount which is 1.2 times or more of the calculated average impregnation amount was calculated by the following equation.

Percentage of sites having impregnation amount which is 1.2 times or more of average impregnation amount (%)=(number of sites having impregnation amount which is 1.2 times or more of average impregnation amount/50)×100

(Air Flow Rate (mL/cm²/sec))

The air flow rates of a nonwoven fabric having a size of 30 cm×50 cm at arbitrary 45 points therein at a barometer pressure of 125 Pa were measured based on JIS L 1906: 2000 4.8 (1) Frazier method. However, the average value thereof was rounded to second decimal point.

(Stability Under High Solute Concentration)

The composite semipermeable membrane was immersed in concentrated seawater, adjusted to a TDS concentration of 7.0%, a temperature of 25° C. and a pH of 8, for 100 hours, and the permeation flux ratio and boron SP ratio before and after the immersion were obtained. Here, "SP" refers to the abbreviation of substance permeation.

Permeation flux ratio=permeation flux after passing water/permeation flux before passing water Born SP ratio=(100−boron removal ratio after passing water)/(100−boron removal ratio before passing water)

(Pressure Resistance)

A permeated liquid channel member (tricot (thickness: 300 μm, groove width: 200 μm, row width: 300 μm, groove depth: 105 μm)) was provided to a permeation side, and seawater (TDS concentration: 3.5%), adjusted to a temperature of 25° C. and a pH of 6.5, was passed for 1 min×200 times at a pressure of 7.0 MPa, and the change in membrane thickness before and after passing water was measured. In addition, the permeation flux ratio and boron SP ratio before and after passing water were measured.

(Functional Group Analysis of Separation Functional Layer by $^{13}C$ Solid-State NMR Method)

The measurement of a separation functional layer by a $^{13}C$ solid-state NMR method is as follows. First, after a composite semipermeable membrane having a separation functional layer on a supporting membrane was formed using the manufacturing method of the present invention, a substrate was physically separated from the composite semipermeable membrane to collect a porous supporting layer and a separation functional layer. The collected porous supporting layer and separation functional layer were dried by leaving them at 25° C. for 24 hours, and then were added to dichloromethane contained in a beaker little by little and stirred to dissolve the polymer constituting the porous supporting layer. The insoluble matter in the beaker was collected with a filtration paper, and was cleaned with dichloromethane several times. The collected separation functional layer was dried by a vacuum dryer to remove the remained dichloromethane. The obtained separation functional layer was made into a powdered sample by frost shattering, and the powder sample was hermetically charged in a sample tube used in the solid-state NMR method, so as to perform $^{13}C$ solid-state NMR measurement according to the CP/MAS method and the DD/MAS method. In the $^{13}C$ solid-state NMR measurement, CMX-300, manufactured by Chemagnetics Inc., can be used. From the obtained spectra, for each peak derived from a carbon atom to which each functional group is bonded, peak division was performed, and the amount of the function group was quantified from the area of the divided peak.

(Elemental Analysis of Surface of Separation Functional Layer by XPS Measurement)

The composition information of the elements constituting the separation functional layer can be obtained by XPS. Samples used for the XPS measurement were prepared as follows. First, the composite semipermeable membrane fabricated based on the method disclosed in the present invention was dried at 25° C. for 24 hours. The elemental analysis of the surface of the separating functional layer opposite to the supporting membrane was carried out without further processing. On the other hand, since it is required to remove the supporting membrane in the measurement of the surface of the separation functional layer faced to the supporting membrane, first, only the substrate in the supporting membrane was peeled off. The remained composite semipermeable membrane was fixed on a silicon wafer such that the porous supporting layer becomes a surface, and the porous supporting layer was dissolved by dichloromethane, so as to obtain the surface of only the separation functional layer. The XPS measurement of this sample was carried out in the same manner as above, and the elemental analysis of the surface of the separation functional layer faced to the supporting membrane was carried out. In the XPS measurement, for example, ESCALAB220iXL, manufactured by VG Scientific Co., Ltd., can be used. Transverse axis correction was carried out by matching the neutral carbon (CHx) of C1s peak of the obtained spectrum data to 284.6 eV, and then the peak area of each element was calculated.

(TOF-SIMS Measurement)

The composite semipermeable membrane was immersed in ultrapure water for 1 day to be cleaned. This membrane was dried by a vacuum dryer, and TOF-SIMS measurement was carried out. This measurement was carried out using the TOF.SIMS[5], manufactured by ION-TOF Inc. The secondary ions, generated by applying a primary accelerating voltage of 30 kV to $Bi_3^{++}$ as primary ion species, were measured by a time-of-flight mass spectrometer, so as to obtain mass spectra.

Example 1

A DMF solution containing 18.0 wt % of polysulfone (PSf) was cast onto a long fiber-made polyester nonwoven fabric (air flow rate: 2.0 mL/cm$^2$/sec) to a thickness of 200 μm under a condition of 25° C., immediately immersed in pure water, and left for 5 minutes, thereby forming a porous supporting layer.

The obtained supporting membrane was immersed in an aqueous solution containing 5.5 wt % of m-phenylenediamine (m-PDA) for 2 minutes, this supporting membrane was slowly lifted in the vertical direction, the remained aqueous solution was removed from the surface of the supporting membrane by blowing nitrogen from an air nozzle, and then an n-decane solution containing 0.165 wt % of trimesic acid chloride (TMC) at 25° C. was applied such that the surface of the supporting membrane is completely wetted, and left for 1 minute. Subsequently, in order to remove the remained solution from the membrane, this membrane was vertically maintained for liquid removal for 1 minute, and was then cleaned with hot water at 50° C. for 2 minutes to obtain a composite semipermeable membrane.

The obtained composite semipermeable membrane was immersed in an aqueous solution containing 0.2 wt % of sodium nitrite, adjusted to a pH of 3.35 at 35° C., for 1 minute. The adjustment of pH of sodium nitrite was performed by sulfuric acid. Subsequently, the composite semipermeable membrane was immersed in an aqueous solution containing 0.3 wt % of aniline at 35° C. for 1 minute to perform a diazo coupling reaction. Finally, the composite semipermeable membrane was immersed in an aqueous solution containing 0.1 wt % of sodium sulfite at 35° C. for 2 minutes.

As the result of evaluating the membrane performance of the composite semipermeable membrane obtained in this way, membrane permeation flux, solute removal ratio, and boron removal ratio are the values shown in Table 2, respectively. Further, as the result of evaluating the stability and pressure resistance of the composite semipermeable membrane under a high solute concentration condition, permeation flux ratio and boron SP ratio are shown in Table 2. The functional group ratio of the separation functional layer, elemental composition, the weight of the porous supporting layer per unit volume, average impregnation amount, the air flow rate of the substrate, and the difference in fiber orientation degree of the substrate are shown in Table 1, respectively.

Examples 2 to 12

Each composite semipermeable membrane was fabricated in the same manner as in Example 1, except for the conditions given in Table 1 and Table 2. As the result of evaluating the obtained composite semipermeable membrane, the performances thereof are given in Table 1 and Table 2.

Example 13

The composite semipermeable membrane obtained in Example 6 was immersed in an aqueous solution containing 0.1 ppm of polyethylene glycol (number average molecular weight: 8,000, manufactured by Wako Pure Chemical Industries, Ltd.) for 1 hour to obtain a composite semipermeable membrane of Example 13. As the result of evaluating the obtained composite semipermeable membrane, the performances thereof are given in Table 1 and Table 2.

Example 14

The composite semipermeable membrane obtained in Example 6 was immersed in an aqueous solution containing 1 ppm of polyethylene glycol (number average molecular weight: 8,000, manufactured by Wako Pure Chemical Industries, Ltd.) for 1 hour to obtain a composite semipermeable membrane of Example 14. As the result of evaluating the obtained composite semipermeable membrane, the performances thereof are given in Table 1 and Table 2. As the result of measuring the stability of the composite semipermeable membrane under a high solute concentration condition and then performing the analysis of the surface of the separation functional layer according to TOF-SIMS, a polyethylene glycol-derived peak ($^{45}C_2H_5O^+$) was detected in addition to a crosslinked wholly aromatic polyamide-derived benzene ring peak ($^{75}C_6H_3^+$).

Example 15

The composite semipermeable membrane obtained in Example 6 was immersed in an aqueous solution containing 1,000 ppm of polyethylene glycol (number average molecular weight: 8,000, manufactured by Wako Pure Chemical Industries, Ltd.) for 1 hour to obtain a composite semipermeable membrane of Example 15. As the result of evaluating the obtained composite semipermeable membrane, the performances thereof are given in Table 1 and Table 2. As the result of measuring the stability of the composite semipermeable membrane under a high solute concentration condition and then performing the analysis of the surface of the separation functional layer according to TOF-SIMS, a polyethylene glycol-derived peak ($^{45}C_2H_5O^+$) was detected in addition to a crosslinked wholly aromatic polyamide-derived benzene ring peak ($^{75}C_5H_3^+$).

Example 16

The composite semipermeable membrane obtained in Example 6 was immersed in an aqueous solution containing 10,000 ppm of polyethylene glycol (number average molecular weight: 8,000, manufactured by Wako Pure Chemical Industries, Ltd.) for 1 hour to obtain a composite semipermeable membrane of Example 16. As the result of evaluating the obtained composite semipermeable membrane, the performances thereof are given in Table 1 and Table 2. As the result of measuring the stability of the composite semipermeable membrane under a high solute concentration condition and then performing the analysis of the surface of the separation functional layer according to TOF-SIMS, a polyethylene glycol-derived peak ($^{45}C_2H_5O^+$) was detected in addition to a crosslinked wholly aromatic polyamide-derived benzene ring peak ($^{75}C_6H_3^+$).

Example 17

The composite semipermeable membrane obtained in Example 6 was immersed in an aqueous solution containing 1 ppm of polyethylene glycol (number average molecular weight: 2,000, manufactured by Wako Pure Chemical Industries, Ltd.) for 1 hour to obtain a composite semipermeable membrane of Example 17. As the result of evaluating the obtained composite semipermeable membrane, the performances thereof are given in Table 1 and Table 2. As the result of measuring the stability of the composite semipermeable membrane under a high solute concentration condition and then performing the analysis of the surface of the separation functional layer according to TOF-SIMS, a polyethylene glycol-derived peak ($^{45}C_2H_5O^+$) was detected in addition to a crosslinked wholly aromatic polyamide-derived benzene ring peak ($^{75}C_6H_3^+$).

Example 18

The composite semipermeable membrane obtained in Example 6 was immersed in an aqueous solution containing 1 ppm of polyethylene glycol (number average molecular weight: 400, manufactured by Wako Pure Chemical Industries, Ltd.) for 1 hour to obtain a composite semipermeable membrane of Example 18. As the result of evaluating the obtained composite semipermeable membrane, the performances thereof are given in Table 1 and Table 2.

Example 19

The composite semipermeable membrane obtained in Example 6 was immersed in an aqueous solution containing 1 ppm of Pluronic F-127 (manufactured by Sigma-Aldrich Co., Ltd.) for 1 hour to obtain a composite semipermeable membrane of Example 19. As the result of evaluating the obtained composite semipermeable membrane, the performances thereof are given in Table 1 and Table 2. As the result of measuring the stability of the composite semipermeable membrane under a high solute concentration condition and then performing the analysis of the surface of the separation functional layer according to TOF-SIMS, a polyethylene glycol-derived peak ($^{45}C_2H_5O^+$) was detected in addition to a crosslinked wholly aromatic polyamide-derived benzene ring peak ($^{75}C_6H_3^+$).

Example 20

The composite semipermeable membrane obtained in Example 6 was immersed in an aqueous solution containing 1 ppm of polyacrylic acid (number average molecular weight: 25,000, manufactured by Wako Pure Chemical Industries. Ltd.) for 1 hour to obtain a composite semipermeable membrane of Example 20. As the result of evaluating the obtained composite semipermeable membrane, the performances thereof are given in Table 1 and Table 2.

Comparative Examples 1 to 3

Each composite semipermeable membrane was fabricated in the same manner as in Example 1, except that the conditions given in Tables 1 and 2 were changed.

In Comparative Example 1, treatment with an aqueous solution of sodium nitrite and a diazo coupling reaction were not carried out. As the result of evaluating the obtained composite semipermeable membrane, the performances thereof are given in Table 1 and Table 2.

Comparative Example 4

A composite semipermeable membrane was fabricated in the same manner as in Example 1, except that diazo coupling reaction conditions were changed. That is, a composite semipermeable membrane was previously immersed in an aqueous solution containing 0.3% of m-PDA at 35° C. for 1 minute, and then was immersed in an aqueous solution containing 0.2 wt % of sodium nitrite, adjusted to a pH of 3.35 at 35° C., for 1 minute. As the result of evaluating the obtained composite semipermeable membrane, the performances thereof are given in Table 1 and Table 2.

TABLE 1

| Table 1 | Separation functional layer | | | Porous supporting layer | | | | Substrate | | Difference in fiber orientation degree of substrate (degree) |
|---|---|---|---|---|---|---|---|---|---|---|
| | Phenolic | | | | | | | | | |
| | Carboxy group/ amide group (—) | hydroxyl group/ amide group (—) | Oxygen atoms/ nitrogen atoms (—) | PSf concentration (%) | Weight per unit volume (g/cm$^3$) | Average impregnation amount (g/cm$^3$) | Sites of 1.2 times or more (%) | kind (—) | Air flow rate (mL/cm$^2$/sec) | |
| Ex. 1 | 0.41 | 0.06 | 0.93 | 18.0 | 0.60 | 1.9 | 22 | long fiber | 2.0 | 21 |
| Ex. 2 | 0.46 | 0.07 | 0.89 | 18.0 | 0.62 | 1.8 | 22 | long fiber | 2.0 | 23 |
| Ex. 3 | 0.45 | 0.09 | 0.92 | 15.7 | 0.78 | 2.4 | 16 | long fiber | 2.0 | 23 |
| Ex. 4 | 0.46 | 0.05 | 0.81 | 18.0 | 0.63 | 2.0 | 20 | long fiber | 2.0 | 24 |
| Ex. 5 | 0.41 | 0.10 | 0.95 | 18.0 | 0.59 | 2.0 | 24 | long fiber | 2.0 | 21 |
| Ex. 6 | 0.47 | 0.07 | 0.87 | 18.0 | 0.62 | 1.8 | 22 | long fiber | 2.0 | 20 |
| Ex. 7 | 0.45 | 0.09 | 0.88 | 15.7 | 0.80 | 2.4 | 16 | long fiber | 2.0 | 22 |
| Ex. 8 | 0.42 | 0.06 | 0.82 | 18.0 | 0.55 | 2.0 | 20 | long fiber | 2.0 | 24 |
| Ex. 9 | 0.42 | 0.09 | 0.93 | 18.0 | 0.72 | 0.7 | 10 | short fiber | 0.4 | — |
| Ex. 10 | 0.44 | 0.10 | 0.94 | 15.7 | 0.84 | 2.3 | 16 | long fiber | 2.0 | 20 |
| Ex. 11 | 0.49 | 0.08 | 0.90 | 24.0 | 0.59 | 0.9 | 20 | long fiber | 2.0 | 25 |
| Ex. 12 | 0.49 | 0.10 | 0.84 | 18.0 | 0.62 | 1.8 | 22 | long fiber | 2.0 | 20 |
| Ex. 13 | 0.47 | 0.07 | 0.87 | 18.0 | 0.62 | 1.8 | 22 | long fiber | 2.0 | 20 |
| Ex. 14 | 0.47 | 0.07 | 0.87 | 18.0 | 0.62 | 1.8 | 22 | long fiber | 2.0 | 20 |
| Ex. 15 | 0.47 | 0.07 | 0.87 | 18.0 | 0.62 | 1.8 | 22 | long fiber | 2.0 | 20 |
| Ex. 16 | 0.47 | 0.07 | 0.87 | 18.0 | 0.62 | 1.8 | 22 | long fiber | 2.0 | 20 |
| Ex. 17 | 0.47 | 0.07 | 0.87 | 18.0 | 0.62 | 1.8 | 22 | long fiber | 2.0 | 20 |
| Ex. 18 | 0.47 | 0.07 | 0.87 | 18.0 | 0.62 | 1.8 | 22 | long fiber | 2.0 | 20 |
| Ex. 19 | 0.47 | 0.07 | 0.87 | 18.0 | 0.62 | 1.8 | 22 | long fiber | 2.0 | 20 |
| Ex. 20 | 0.47 | 0.07 | 0.87 | 18.0 | 0.62 | 1.8 | 22 | long fiber | 2.0 | 20 |
| Comp. Ex. 1 | 0.45 | 0.01 | 1.02 | 18.0 | 0.60 | 2.0 | 22 | long fiber | 2.0 | 26 |

TABLE 1-continued

| Table 1 | Separation functional layer | | | Porous supporting layer | | | | Substrate | | Difference in fiber orientation degree of substrate (degree) |
|---|---|---|---|---|---|---|---|---|---|---|
| | Phenolic | | | | | | | | | |
| | Carboxy group/ amide group (—) | hydroxyl group/ amide group (—) | Oxygen atoms/ nitrogen atoms (—) | PSf concentration (%) | Weight per unit volume (g/cm³) | Average impregnation amount (g/cm³) | Sites of 1.2 times or more (%) | kind (—) | Air flow rate (mL/cm²/sec) | |
| Comp. Ex. 2 | 0.39 | 0.15 | 1.05 | 18.0 | 0.60 | 2.1 | 22 | long fiber | 2.0 | 24 |
| Comp. Ex. 3 | 0.39 | 0.14 | 1.03 | 18.0 | 0.58 | 2.0 | 20 | long fiber | 2.0 | 23 |
| Comp. Ex. 4 | 0.36 | 0.16 | 1.12 | 18.0 | 0.63 | 2.0 | 22 | long fiber | 2.0 | 25 |

TABLE 2

| Table 2 | m-PDA concentration (%) | TMC concentration (%) | Nitrous acid concentration (%) | Coupling compound (—) | Coupling concentration (%) |
|---|---|---|---|---|---|
| Ex. 1 | 5.5 | 0.165 | 0.2 | aniline | 0.3 |
| Ex. 2 | 5.5 | 0.165 | 0.4 | aniline | 0.3 |
| Ex. 3 | 5.5 | 0.165 | 0.4 | aniline | 0.3 |
| Ex. 4 | 5.5 | 0.165 | 0.4 | aniline | 1.0 |
| Ex. 5 | 5.5 | 0.165 | 0.2 | m-PDA | 0.3 |
| Ex 6 | 5.5 | 0.165 | 0.4 | m-PDA | 0.3 |
| Ex. 7 | 5.5 | 0.165 | 0.4 | m-PDA | 0.3 |
| Ex. 8 | 5.5 | 0.165 | 0.4 | m-PDA | 1.0 |
| Ex. 9 | 5.5 | 0.165 | 0.4 | m-PDA | 0.3 |
| Ex. 10 | 5.5 | 0.165 | 0.4 | m-PDA | 0.3 |
| Ex. 11 | 5.5 | 0.165 | 0.4 | m-PDA | 0.3 |
| Ex. 12 | 5.5 | 0.165 | 0.4 | diamino-pyridine | 0.3 |
| Ex. 13 | 5.5 | 0.165 | 0.4 | m-PDA | 0.3 |
| Ex. 14 | 5.5 | 0.165 | 0.4 | m-PDA | 0.3 |
| Ex. 15 | 5.5 | 0.165 | 0.4 | m-PDA | 0.3 |
| Ex. 16 | 5.5 | 0.165 | 0.4 | m-PDA | 0.3 |
| Ex. 17 | 5.5 | 0.165 | 0.4 | m-PDA | 0.3 |
| Ex. 18 | 5.5 | 0.165 | 0.4 | m-PDA | 0.3 |
| Ex. 19 | 5.5 | 0.165 | 0.4 | m-PDA | 0.3 |
| Ex. 20 | 5.5 | 0.165 | 0.4 | m-PDA | 0.3 |
| Comp. Ex. 1 | 5.5 | 0.165 | — | — | — |
| Comp. Ex. 2 | 5.5 | 0.165 | 0.4 | aniline | 0.05 |
| Comp. Ex. 3 | 5.5 | 0.165 | 0.4 | m-PDA | 0.05 |
| Comp. Ex. 4 | 5.5 | 0.165 | 0.4 | — | — |

| Table 2 | Membrane performance (5.5 MPa) | | | Stability under high solute concentration condition | | Pressure resistance | |
|---|---|---|---|---|---|---|---|
| | Membrane permeation flux (m³/m²/d) | Solute removal ratio (%) | Boron removal ratio (%) | Permeation flux ratio (—) | Boron SP ratio (—) | Permeation flux ratio (—) | Boron SP ratio (—) |
| Ex. 1 | 1.28 | 99.7 | 90.4 | 1.18 | 1.20 | 0.86 | 1.04 |
| Ex. 2 | 1.21 | 99.8 | 91.9 | 1.08 | 1.11 | 0.88 | 1.01 |
| Ex. 3 | 1.19 | 99.8 | 92.3 | 1.12 | 1.18 | 0.72 | 1.44 |
| Ex. 4 | 0.88 | 99.8 | 94.5 | 1.04 | 1.09 | 0.89 | 1.05 |
| Ex. 5 | 1.14 | 99.7 | 92.0 | 1.19 | 1.22 | 0.89 | 1.01 |
| Ex 6 | 0.99 | 99.8 | 93.7 | 1.07 | 1.10 | 0.87 | 1.05 |
| Ex. 7 | 1.02 | 99.8 | 93.4 | 1.13 | 1.17 | 0.70 | 1.42 |
| Ex. 8 | 0.80 | 99.8 | 95.2 | 1.05 | 1.07 | 0.85 | 1.03 |
| Ex. 9 | 0.88 | 99.8 | 93.9 | 1.14 | 1.18 | 0.70 | 1.35 |
| Ex. 10 | 1.05 | 99.7 | 91.5 | 1.10 | 1.22 | 0.73 | 1.40 |
| Ex. 11 | 0.78 | 99.8 | 94.8 | 1.09 | 1.15 | 0.90 | 1.06 |
| Ex. 12 | 1.03 | 99.7 | 93.2 | 1.13 | 1.18 | 0.88 | 1.05 |
| Ex. 13 | 0.97 | 99.8 | 93.9 | 1.05 | 1.08 | 0.86 | 1.07 |
| Ex. 14 | 0.91 | 99.8 | 95.0 | 1.03 | 1.05 | 0.89 | 1.05 |
| Ex. 15 | 0.86 | 99.8 | 95.2 | 1.03 | 1.05 | 0.88 | 1.06 |

TABLE 2-continued

| | | | | | | | |
|---|---|---|---|---|---|---|---|
| Ex. 16 | 0.80 | 99.8 | 95.4 | 1.02 | 1.05 | 0.85 | 1.09 |
| Ex. 17 | 0.94 | 99.8 | 94.3 | 1.05 | 1.09 | 0.88 | 1.07 |
| Ex. 18 | 1.00 | 99.8 | 93.7 | 1.07 | 1.12 | 0.86 | 1.06 |
| Ex. 19 | 0.90 | 99.8 | 95.2 | 1.03 | 1.05 | 0.88 | 1.07 |
| Ex. 20 | 1.01 | 99.8 | 93.3 | 1.05 | 1.09 | 0.87 | 1.08 |
| Comp. Ex. 1 | 0.90 | 99.7 | 90.1 | 1.29 | 1.33 | 0.83 | 1.02 |
| Comp. Ex. 2 | 1.25 | 99.6 | 88.2 | 1.30 | 1.41 | 0.85 | 1.06 |
| Comp. Ex. 3 | 1.22 | 99.6 | 88.7 | 1.28 | 1.36 | 0.86 | 1.07 |
| Comp. Ex. 4 | 0.82 | 99.8 | 94.4 | 1.33 | 1.44 | 0.80 | 1.09 |

From Table 1 and Table 2, it has been found that the composite semipermeable membranes of Examples 1 to 20, in each which the functional group ratio of the polyamide separation functional layer and the ratio of oxygen/nitrogen are controlled, have higher membrane performance stability under a high solute concentration condition than the composite semipermeable membranes of Comparative Examples 1 to 4. Further, it has been found that, by using a long-fiber nonwoven fabric having a large fiber orientation degree difference as a substrate and using a porous supporting layer in which the weight thereof per unit volume was controlled, a composite semipermeable membrane having high pressure resistance can be obtained.

While the invention has been described in detail and with reference to specific embodiments thereof it will be apparent to one skilled in the art that various changes and modifications can be made without departing from the spirit and scope thereof. This application is based on Japanese Patent Application filed on Feb. 28, 2013 (Application No. 2013-039649), the content thereof being incorporated herein by reference.

INDUSTRIAL APPLICABILITY

The composite semipermeable membrane according to the present invention can be suitably used for desalination of brackish water or seawater.

The invention claimed is:

1. A composite semipermeable membrane comprising:
a substrate;
a porous supporting layer formed on the substrate; and
a separation functional layer formed on the porous supporting layer, the separation functional layer having a rear surface facing the porous supporting layer and a front surface on an opposite side,
wherein the separation functional layer contains crosslinked wholly aromatic polyamide as a main component and contains carboxy groups,
a ratio of (molar equivalent of the carboxy groups)/(molar equivalent of amide groups) in functional groups contained in the separation functional layer crosslinked wholly aromatic polyamide is 0.40 or more and 0.60 or less, wherein the ratio is obtained using $^{13}C$ solid-state NMR measurement according to the CP/MAS method and the DD/MAS method, wherein from the obtained spectra, for each peak derived from a carbon atom to which each functional group is bonded, peak division is performed and the amount of the functional group is quantified from the area of the divided peak,
an average ratio of oxygen atoms/nitrogen atoms in front and rear surfaces of the separation functional layer is 0.80 or more and 0.95 or less, wherein the average ratio is obtained by using X-ray photoelectron spectroscopy analysis,
the separation functional layer is coated with a hydrophilic polymer, and
the separation functional layer contains phenolic hydroxyl groups such that a ratio of (molar equivalent of the phenolic hydroxyl groups)/(molar equivalent of the amide groups) is 0.10 or less, wherein the ratio is obtained using $^{13}C$ solid-state NMR measurement according to the CP/MAS method and the DD/MAS method, wherein from the obtained spectra, for each peak derived from a carbon atom to which each functional group is bonded, peak division is performed and the amount of the functional group is quantified from the area of the divided peak.

2. The composite semipermeable membrane according to claim 1, wherein the hydrophilic polymer has an average molecular weight of 8,000 or more.

3. The composite semipermeable membrane according to claim 1, wherein the hydrophilic polymer is polyethylene glycol or a copolymer containing polyethylene glycol.

4. The composite semipermeable membrane according to claim 1, wherein a weight of the porous supporting layer per unit volume, after passing pure water at a temperature of 25° C. and a pressure of 5.5 MPa for 24 hours or more, is 0.50 g/cm³ to 0.65 g/cm³.

5. The composite semipermeable membrane according to claim 1, wherein an average impregnation amount of the porous supporting layer into the substrate per unit area is 1.0 g/m² to 5.0 g/m², and 20% or more of the substrate sites have an impregnation amount which is 1.2 times or more of the average impregnation amount.

6. The composite semipermeable membrane according to claim 1, wherein the substrate is a long-fiber nonwoven fabric, and an air flow rate of the substrate is 0.5 mL/cm²/sec to 5.0 mL/cm²/sec.

7. The composite semipermeable membrane according to claim 1, wherein the substrate is a long-fiber nonwoven fabric, and a difference in a degree of fiber orientation between fibers in a surface of the substrate facing the porous supporting layer and fibers in a surface of the substrate opposite to the porous supporting layer is 10° to 90°.

8. The composite semipermeable membrane according to claim 1, wherein, when feed water having conditions of a TDS concentration of 3.5%, a boron concentration of 5 ppm, a pH of 6.5, and a temperature of 25° C. permeates the composite semipermeable membrane at an operation pressure of 5.5 MPa, a membrane permeation flux thereof is 0.9 m³/m²/day or more, and a boron removal ratio thereof satisfies the following formula:

(boron removal ratio (%)) ≥ 103 − 10 × (membrane permeation flux(m³/m²/day)).     (5)

\* \* \* \* \*